US012219961B2

(12) United States Patent
Johnston

(10) Patent No.: US 12,219,961 B2
(45) Date of Patent: *Feb. 11, 2025

(54) FRAGRANT HORTICULTURAL CARE COMPOSITION

(71) Applicant: Richard Thomas Johnston, Greer, SC (US)

(72) Inventor: Richard Thomas Johnston, Greer, SC (US)

(73) Assignee: Richard Thomas Johnston, Moore, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,345

(22) Filed: Oct. 30, 2023

(65) Prior Publication Data

US 2024/0065275 A1 Feb. 29, 2024

Related U.S. Application Data

(62) Division of application No. 17/581,435, filed on Jan. 21, 2022, now Pat. No. 11,864,560.

(51) Int. Cl.
| | | |
|---|---|---|
| *A01N 65/36* | (2009.01) | |
| *A01N 25/30* | (2006.01) | |
| *A01N 43/16* | (2006.01) | |
| *A01N 65/06* | (2009.01) | |
| *A01N 65/08* | (2009.01) | |
| *A01N 65/22* | (2009.01) | |
| *A01N 65/28* | (2009.01) | |
| *A01N 65/30* | (2009.01) | |
| *A01P 7/04* | (2006.01) | |
| *C05F 11/00* | (2006.01) | |
| *C05F 11/02* | (2006.01) | |
| *C05G 3/50* | (2020.01) | |

(52) U.S. Cl.
CPC ............. *A01N 65/36* (2013.01); *A01N 43/16* (2013.01); *A01N 65/08* (2013.01); *A01N 65/22* (2013.01); *A01N 65/28* (2013.01); *A01N 65/30* (2013.01); *A01P 7/04* (2021.08); *C05F 11/00* (2013.01); *C05F 11/02* (2013.01); *C05G 3/50* (2020.02)

(58) Field of Classification Search
None
See application file for complete search history.

(56) References Cited

U.S. PATENT DOCUMENTS

| | | |
|---|---|---|
| 6,635,433 B1 | 10/2003 | de Almeida et al. |
| 7,247,377 B2 | 7/2007 | Jassan |
| 7,488,703 B2 | 2/2009 | Rubin |
| 8,993,004 B2 | 3/2015 | Lindner et al. |
| 9,999,227 B2 | 6/2018 | Manhas |
| 10,865,156 B2 | 12/2020 | Kalmbach |
| 10,905,114 B2 | 2/2021 | Manhas |

FOREIGN PATENT DOCUMENTS

CN 111670979 * 9/2020

OTHER PUBLICATIONS

Abstract of CN 102428975 (May 2, 2012).*
McKeen, S., "Rediscovering the merits of hemp; a cloud of marijuana smoke has obscured the environmental benefits of hemp, advocates say," Edmonton Journal, Environment section, p. D5, Apr. 25, 1993.*
"Minnesota on road to approving hemp," Expositor, p. C2, Mar. 10, 1999.*
Franklin, K. et al., "Swap store-bought fertilizer for your own 'green' manure," Honolulu Star—Advertiser, Features Premium section, Dec. 3, 2012.*
Abstract of CN 113079919 (Jul. 2019), claim 1 translation included.*
Machine translation of CN 108541496 (Sep. 2018).*
Abstract of CN 107156058 (Sep. 15, 2017).*

* cited by examiner

*Primary Examiner* — John Pak
(74) *Attorney, Agent, or Firm* — Blaine Childress; ChemAu LLC

(57) ABSTRACT

This invention relates to aqueous plant treatment compositions that improve the environmental experience of the consumer and industrial grower while contributing to the health of plants. Compositions of the invention include mixtures of naturally sourced fragrances, plant sourced micronutrients, plant sourced pesticides, naturally sourced emulsifying agents, and odor sequestering agents. Compositions are combined as solutions that may be disposed onto soil, plant foliage, or onto cellulosic substrate to reduce or eliminate the malodors of plant treatments as from previous organic fertilizers or from pesticides, while imparting a pleasant post treatment fragrance.

7 Claims, No Drawings

FRAGRANT HORTICULTURAL CARE COMPOSITION

CROSS-REFERENCE TO RELATED APPLICATIONS

This application is a divisional of U.S. application Ser. No. 17/581,435 filed Jan. 21, 2022, which claims the benefit of U.S. Provisional Patent Application No. 63/260,733 filed Aug. 31, 2021, the disclosures of which is are hereby incorporated in their entirety by reference thereto.

FIELD OF THE INVENTION

The present invention is generally directed to biologically sourced fragrant horticultural nutrient products and pesticides. The compositions of the invention may be advantageously disposed directly onto plant foliage, a cellulosic substrate, or disposed onto soil, to supply plant nutrients and control pests, without the unpleasant odors often associated with "organic" products. In some embodiments additional plant-sourced fragrance is added to deliver a pleasant aroma which can enhance the experience.

BACKGROUND OF THE INVENTION

Organic fertilizers or other plant care products are recognized as including important nutrients; however, such nutrients are often derived from animal components such as urea, bone meal, worm castings, animal manure, and fish emulsions. Many such naturally sourced products are therefore associated with an immediate and lingering unpleasant odor. When such prior art organic fertilizers are applied, the lingering malodors of animal sourced nutrients are particularly objectionable when tending plants in indoor spaces. Similarly, the application of chemical pesticides often results in objectionable odors. The greater home time, such as remote working and remote schooling attributable to the COVID pandemic has increased indoor plant interest, however, the corresponding greater indoor plant tending has also heightened an awareness of the malodors attributable to organic fertilizers and concerns about chemical pesticides. In addition to such indoor odor concerns, outdoor living spaces such as floral focal points and patio container gardens, may emit malodors when tending to plant nutrition or when using chemical pesticides for insect control.

Therefore, it would be beneficial to eliminate or greatly reduce the unpleasant smells that often accompany previous plant treatment ingredients. Furthermore, it would be beneficial to enhance the experience of plant care with an accompanying pleasant fragrance.

SUMMARY OF THE INVENTION

The inventor has conducted extensive research directed to providing horticultural nutrients and especially micronutrients needed for plant health, by focusing on sustainable plant sources. In particular this research has been directed toward means of incorporating horticultural micronutrients into aqueous compositions derived from the saps and aqueous extracts of more sustainable, faster growing plants and from plant harvest waste. Hemp sap and industrial hemp sap have been found to be especially useful as a source of minerals and micronutrients for formulating horticultural fertilizers. However, while hemp sap is rich in important micronutrients, its array of micronutrient profile somewhat depends on the soil and conditions of its growth.

Consequently, when preparing optimized plant care formulations, it is often beneficial to supplement a hemp sap feedstock with additional saps or plant extracts to achieve a full spectrum of trace element nutrients. For example, hemp sap may be blended with buckwheat, moringa, or barley saps, or in the case of dried plant feedstock, reconstituted aqueous extracts, to obtain a composition providing a desired balance of essential nutrients and micronutrients. Compositions of the invention advantageously deliver essential trace element arrays useful in live plant health, derived from harvested plant sources, without the objectionable odors so often associated with prior art natural fertilizers. Compositions of the invention may be further enhanced by incorporating pleasant plant sourced fragrances, beyond aromas supplied by hemp and other saps and aqueous extracts.

The inventive compositions address the use of pesticides as part of responsible care. Chemical pesticides are associated with odors that are unpleasant or that may be deemed unsafe, especially with indoor plant care. The inventor has endeavored to address this problem by combining hemp sap or hemp aqueous extract with herbal pesticides and fragrances, to provide aqueous horticultural care products that preserve plant health without unpleasant odors. Formulations of the invention may therefore not only deliver nutrition or help to repel harmful insects in the form of aqueous sprays, but they are also able to impart a pleasant post-treatment fragrance. These and other advantages derived from the invention are described herein.

DETAILED DESCRIPTION OF THE INVENTION

In one aspect the invention relates to an aqueous plant-sourced nutrient composition, suitable for dispensing onto a horticultural plant, including blends of hemp sap and other plant saps as well as reconstituted aqueous extracts of dried plants or the waste from crop harvests.

In another aspect the invention relates to an aqueous plant sourced nutrient composition or plant sourced pesticide composition including a naturally sourced fragrance, an emulsifying agent and, optionally, a naturally sourced malodor sequestering agent.

In another embodiment the invention relates to aqueous plant sourced compositions, suitable for dispensing onto a horticultural plant, comprising hemp sap or hemp aqueous extract as a trace element plant nutrient source, and a naturally sourced fragrance, wherein the composition is dispensed in the form of an aqueous spray.

In another aspect the invention relates to a composition suitable for dispensing to a live horticultural plant, comprising a naturally sourced fragrance, an emulsifying agent, and hemp sap, wherein the composition is dispensed during soil watering.

In yet another aspect the invention relates to an aqueous plant-sourced composition, suitable for dispensing onto a horticultural plant, comprising hemp sap as trace element plant nutrient source, and a naturally sourced fragrance, wherein the natural fragrance source comprises the sap, juice, essential oil, or aqueous extract of at least one member selected from of the group consisting of lavender, lemon, orange, rosemary, clove, cedarwood, pine, *eucalyptus*, mint, almond, rose, walnut, and sandalwood.

In another aspect the invention relates to an aqueous composition suitable for dispensing to the soil, leaves, and stem of a horticultural plant, comprising a naturally sourced fragrance, an emulsifying agent, water, and a pesticide, wherein the pesticide comprises thyme oil, *chrysanthemum* extract, pyrethrin, cinnamon oil, geraniol, farnesol, garlic extracts, and hot pepper extracts.

In another aspect, the invention relates to a composition suitable for dispensing to a horticultural plant, comprising a naturally sourced fragrance, a naturally sourced malodor sequestering agent, a nutrient source including hemp sap, and an emulsifying agent, wherein the emulsifying agent may be selected from hemp sap and at least one member of the group consisting of pectin, glycerin, coconut soap, zinc stearate, sodium citrate, sodium glucoheptonate, non-ionic surfactant, sulfonated castor oil, sulfonated olive oil, sodium gluconate, glycerin, citric acid, polysorbate 80, polysorbate 60, and polysorbate 20.

In another aspect the invention relates to a composition suitable for dispensing to a horticultural plant, comprising a naturally sourced fragrance, an emulsifying agent, and water, wherein the emulsifying agent comprises pectin.

In another aspect the invention relates to a fragrant nutrient mulch comprising hemp, a naturally sourced fragrance, aqueous plant trace element nutrients; and a surfactant, wherein the naturally sourced fragrance, the plant nutrient, and the surfactant are combined and thereafter disposed onto the hemp to provide a fragrant nutrient rich mulch. As used herein, hemp includes the use of waste fibrous product from *Cannabis sativa, cannabis indica*, and *cannabis* hybrids.

In another aspect the invention relates to a fragrant nutrient mulch comprising, dried crop cellulosic waste, said cellulosic waste comprising hemp, cotton, corn stalk, corn shuck, and chopped sugar cane, a naturally sourced fragrant oil, an aqueous plant trace element nutrients, a surfactant, and optionally, a naturally sourced malodor sequestering agent, wherein the naturally sourced fragrance, the optional odor sequestering agent, the plant nutrient, and the surfactant are combined with water, and disposed onto the cellulosic crop waste, and then dried to provide a fragrant nutrient mulch.

In some embodiments, the invention describes compositions containing plant-sourced trace element nutrients supplied by at least about 0.05% by volume of hemp sap, an emulsifying agent, and additional plant-sourced trace elements supplied by at least about 0.05% by volume of the sap or of the aqueous extract, of at least one plant selected from the group consisting of buckwheat, cotton, corn, moringa, bamboo, soybean, bean, rice, sweet potato, kenaf, sugar beet, flax, sunflower, barley, and oats.

In some embodiments of the invention, compositions include plant-sourced trace element nutrients supplied from at least about 0.05% by volume to about 55% by volume of hemp sap or hemp aqueous extract, an emulsifying agent, and additional plant-sourced trace elements supplied from at least about 0.05% by volume to about 25% by volume of the sap, juice, or aqueous extract of at least one plant selected from the group consisting of buckwheat, cotton, corn, moringa, bamboo, soybean, bean, rice, sweet potato, kenaf, sugar beet, flax, sunflower, barley, and oats.

In some embodiments the invention relates to nutrient compositions including a plant-sourced malodor sequestering agent provided by the aqueous extract or sap of at least one member of the group consisting of ground corn cob, zinc ricinoleate, lemon grass, and cyclodextrins.

In some embodiments the invention relates to compositions including an effective amount of plant-sourced fragrant juice, sap, oil, or aqueous extract selected from the group consisting of melon, apple, cherry, nutmeg, sage, cardamon, mango, bergamot, geranium, copaiba, lavender, rosemary, lemon, clove, cedar, *eucalyptus*, almond, cinnamon, mint, rose, tangerine, tea tree, jasmine, and sandalwood.

In some embodiments the invention relates to compositions including at least one plant part sourced juice or sap colorant or aqueous extract colorant, selected from the group consisting of turmeric, red beet, pokeberry, carrot, mulberry, red radish, mustard, and natural indigo.

In some embodiments the invention relates to compositions including a macronutrient comprising at least one member of the group comprising at least one metal salt of gluconic acid or sulfuric acid. In such embodiments, metals may be selected from the list of calcium, magnesium, and potassium.

In some embodiments, the invention relates to compositions including a pesticide comprising, about 0.05% by volume to about 75% by volume hemp sap, a plant sourced fragrance, and an emulsifying agent. Other compositional embodiments invention relates to compositions including a plant-sourced pesticide in an effective amount, the pesticide selected from the sap or aqueous extract of hemp sap, citral, tansy, spearmint, nerolidol, mustard, vanillin, lemongrass, peppermint, geraniol, basil, clove, lemon, tea tree, cedarwood, rosemary, castor, marigold, tobacco, *chrysanthemum*, and walnut.

In some embodiments, the invention relates to a fragrant cellulosic substrate prepared from about 0.05% by volume to about 85% by volume of hemp sap nutrient, a surfactant, cellulosic fiber, and an effective amount of a plant-sourced fragrance, where the hemp sap, the fragrance, and the surfactant are combined as an aqueous solution and disposed onto the cellulosic fiber to provide a fragrant cellulosic nutrient substrate. In preferred embodiments the fragrant cellulosic substrate may be used as a horticultural mulch or side dressing. Useful cellulosic fiber sources include cellulosic waste, bast fibers such as hemp, shredded cotton, cotton meal, shredded sweet potato vine, shredded kudzu, shredded corn stalk, shredded corn shuck, pulverized corn cob, and shredded sugar cane.

Examples of emulsifying agents useful in carrying out the invention include plant derivatives such as pectin, sodium alginate, agar, carrageenan, acacia gum, aloe vera sap, anionic surfactants, and non-ionic surfactants. Useful non-ionic surfactants include, gelatin, oleic acid, ethyl oleate, sulfated castor oil, Polysorbate 20, and Polysorbate 60, and Polysorbate 80. Emulsifying agents may be included in the compositions of the invention in amounts of from about 0% to about 10% by weight, such as in amounts from about 0.2% by weight to about 5% by weight, of such as about 1% by weight to about 3% by weight.

As used herein, the term plant sap describes a pressed extract, including the sap, juice, and other fluids of a freshly harvested crop, wherein saps are separated from the pulp and cellulosic parts of the plant. Plant juices and plant saps may be collected in ways familiar to those having skill in the art, including manual or machine powered juicers, hydraulic presses with filtration screens, and Archimedes screw driven extractors. Preferred juicers include those with masticating capabilities useful in extracting sap from fibrous bast plants such as mature hemp, sorghum, or sugar cane stalk. Those having skill in the art recognize that fresh plant saps, whether subsequently fermented or used immediately, will constitute about 95% water.

As used herein, aqueous extracts describe reconstituted harvested plant material, such as grains, hemp, and cereal grasses, that are received in a substantially dry condition, compared to freshly harvested plant materials. To obtain aqueous extracts from dried plant feed stock, the plant materials are steeped or percolated in water, such as heated water, to restore the water content and to permit aqueous collection of plant-sourced trace elements, micronutrients, and macronutrients using the same methods as described for collection of saps from freshly harvested plants.

As used herein, the term naturally sourced fragrance is intended to include plant extracts and oils such as plant pressings, azeotropic distillation, steam distillation, hydrosol condensation, and solvent extracts possessing pleasant aromas. Examples of naturally sourced fragrances include, but are not limited to, thyme oil, clove oil, cedarwood oil, orange oil, *eucalyptus* oil, *cannabis* oil, rosemary oil, copaiba oil, frankincense oil, sage extract, peppermint oil, cinnamon oil, lemon oil, pine oil, tangerine oil, vanilla extract, apple extract, cherry extract, almond extract, rose oil, mint extract, consisting of, nutmeg, sage, cardamon, mango, bergamot, geranium, cinnamon, tea tree, jasmine, orange, walnut oil and sandalwood extract. Certain naturally sourced fragrances act as both a pleasant fragrance and an insect repellant. Examples of naturally sourced fragrance include citral, tansy, spearmint, nerolidol, vanillin, thyme oil, lemongrass oil, peppermint oil, geraniol, basil extract, clove oil, lemon oil, tea tree oil, cedarwood oil, rosemary oil, *eucalyptus* extract, hemp oil, castor oil, marigold extract, tobacco extract, *chrysanthemum* oil, walnut extract, and farnesol. Naturally sourced fragrances may be obtained from several sources such as www.edensgarden.com. Other fragrance additives may be obtained from www.candlescience.com.

As used herein, the term micronutrient describes elemental nutrients that enhance the metabolic health of plants at additive levels of only a few parts per million, for example such as less than 1% by weight, such as less than 0.8%, or such as less than 0.5%, or less than about 0.02%. Micronutrients include for example, Boron, Copper, Iron, Manganese, Molybdenum, Nickel, Chlorine, and Zinc. Information regarding micronutrients and macronutrients may be found in "Nutrients Plants Require for Growth" by Robert L. Mahler, University of Idaho College of Agricultural and Life Sciences, November 2004, herein incorporated in its entirety by reference thereto.

As used herein, the term macronutrient describes plant nutrients that are required in relatively large amounts, such as for example from about 0.1% to about 5.0% by weight of the element. Macronutrients include Nitrogen, Phosphorus Potassium, Calcium, Sulfur, and Magnesium.

As used herein, naturally derived colorant is defined as colorants comprised of plant extracts, such as for example, turmeric powder, red beet powder, blackberry juice powder, carrot powder, mulberry powder, red radish powder, natural indigo powder, and others known to those of skill.

As used herein, the term hemp sap or hemp extract includes hemp flower extract, whole hemp plant extract, hemp root extract and combinations thereof, from the plant family Cannabaceae, including species *Cannabis sativa*, *Cannabis indica*, and *Cannabis* hybrids, both industrial hemp and recreational. The term, industrial hemp is herein defined as incorporating a variety, cultivar, or hybrid of *Cannabis sativa* whose stalk, oil, and leaves contain less than 1%, such as no more than 0.3% of delta-9 tetrahydrocannabinol (Δ9-THC).

Compositions of the invention may include one or more plants saps, aqueous extracts, fragrant oils, trace element micronutrients, anti-fungal oils, emulsifying additives, macronutrients, odor sequestrants, and deionized water prepared by distillation or reverse osmosis. Compositions may be formulated into liquid concentrates, diluted to provide aqueous sprays, or may be applied onto cellulosic waste substrates and dried to provide fragrant nutrient fiber stock useful as mulch or top dressing.

The composition and method of the invention include:

(1) A fragrant aqueous delivery composition, suitable for a horticultural plant or cellulosic substrate comprising:
about 45 percent by weight to about 95 percent by weight of the sap or aqueous extract of hemp;
about 0.05 percent by volume to about 25 percent by volume of the sap or aqueous extract of buckwheat, barley or moringa;
about 0.2 percent by weight to about 3 percent by weight of an emulsifier selected from the group consisting of pectin, polysorbate 20, polysorbate 60, and polysorbate 80;
an effective amount of a plant-sourced pesticide selected from the sap or aqueous extract of at least one member of the group consisting of thyme, *chrysanthemum*, cinnamon, peppermint, citral, tansy, spearmint, nerolidol, vanillin, lemongrass, geranium, basil, clove, lemon, tea tree, cedarwood, rosemary, castor, marigold, and walnut; and an effective amount of a plant-sourced fragrance;
wherein the composition comprises an effective level of trace elements for a horticultural plant; and wherein the percent by weight is based on the total weight of the composition and the percent by volume is based on the total volume of the composition;

(2) a ready to use diluted aqueous nutrient delivery composition, suitable for a horticultural plant or cellulosic substrate, comprising the composition of (1) diluted with deionized water,
wherein the content of the sap or aqueous extract of hemp is about 0.5 percent by weight to about 30 percent by weight of the ready to use diluted aqueous nutrient delivery composition, and the content of the sap or aqueous extract of barley or moringa, about 0.05 percent by volume to about 15 percent by volume of the ready to use diluted aqueous nutrient delivery composition;

(3) the composition set forth in (1), wherein said emulsifier comprises pectin and said fragrance is supplied from the sap, aqueous extract, or distilled concentrate of peppermint, lavender, *eucalyptus*, or pine, which provides a fragrant aqueous nutrient delivery composition;

(4) a diluted fragrant aqueous composition, suitable for direct application as a spray, comprising 1 part by weight of the fragrant aqueous nutrient delivery composition of (3) to about 70 parts by weight to about 130 parts by weight of deionized water;

(5) the composition set forth in (1), further comprising at least one plant-sourced colorant, supplied by the sap or aqueous extract of at least one plant source selected from the group consisting of *rubus*, turmeric, red beet, pokeberry, carrot, mulberry, yarrow, cottonwood, red radish, mustard, safflower, and indigo;

(6) the composition set forth in (1), further comprising one or more additional horticultural plant nutrients selected from the group consisting of metal sulfates of gluconic acid, metal sulfates, and metal oxides;

(7) the composition set forth in (1), further comprising at least one plant-sourced malodor sequestering agent selected from the group consisting of aqueous extract or sap of ground corn cob and cyclodextrins;

(8) the composition set forth in (1), wherein the about 0.05 percent by volume to about 25 percent by volume of the sap or aqueous extract of barley includes 3.96 percent by mass of aqueous extract of buckwheat, based on the total mass of the composition;

(9) the composition set forth in (1), wherein the about 0.05 percent by volume to about 25 percent by volume of the sap or aqueous extract of barley or moringa includes 20.371 to about 25 percent by mass of aqueous extract of moringa, based on the total mass of the composition;

(10) a method of providing nutrients and plant-sourced pesticide to a horticultural plant comprising dispensing the composition set forth in (1) during soil watering; and

(11) a method of providing nutrients and pesticides comprising dispensing the composition set forth in (1) in the form of an aqueous spray.

EXAMPLES

Example 1

3.5 grams of lavender oil, 20 grams of hydroxypropyl beta cyclodextrin, 3687 grams of Harrell's 8-2-4 liquid fertilizer concentrate, obtained from Harrel's LLC in Lakeland, Florida, 4.75 grams hemp sap, 80 grams sodium carboxymethylcellulose, 2 drops of colorant, and 0.25 grams of nonionic surfactant were combined using a high-speed mixer to produce a gallon of plant treatment concentrate. 4 ml. of the concentrate was placed in 118 ml. bottle and then filled with water for a ready-to-feed soil drench. The diluted formulation is useful for providing water and nutrition to potted plants while imparting a lingering pleasant lavender fragrance upon application to the soil around plant.

Example 2

3.5 grams of pine needle essential oil, 20 grams of hydroxypropyl beta cyclodextrin, 3692 grams of Harrell's 8-2-4 liquid fertilizer concentrate liquid fertilizer concentrate, 2.0 grams of humic acid 4.75 grams hemp sap, 80 grams sodium carboxymethylcellulose, 2 drops of color concentrate, and 0.25 grams of nonionic surfactant were combined using a high-speed mixer to produce one gallon of plant treatment concentrate composition. 4 milliliters of the resulting plant treatment concentrate were transferred to a 118 ml. bottle and deionized water was added until filled. A trigger spray top dispenser was added to provide a fragrant foliar nutritional composition for applying to the leaves and stem of an indoor plant.

Example 3

3.5 grams of *eucalyptus* oil, 20 grams of hydroxypropyl beta cyclodextrin, 3772 grams of Harrell's 8-2-4 Formula liquid fertilizer concentrate, 4.75 grams hemp sap, and 0.25 grams of nonionic surfactant, and 30 milliliters of lemon juice are combined with sufficient water, using a high-speed mixer to produce a gallon of plant treatment concentrate. 75 ml. of the resulting concentrate is added to 25 grams of chopped or cut dried hemp and set aside to dry. The resulting fragrant nutrient hemp stock may be used for potted plant mulch or top dressing.

Example 4

The following ingredients were combined to prepare a fragrant nutrient solution. However, the desired emulsion did not remain stable, indicating sodium methyl cellulose to be insufficient as a primary emulsifying agent.

Example 4 Formulation

|   | Ingredient | Percentage by mass |
|---|---|---|
| 1 | Boric Acid | 2.50 |
| 2 | Magnesium Sulfate | 16.25 |
| 3 | Iron Sulfate | 27.00 |
| 4 | Manganese Sulfate | 4.00 |
| 5 | Sodium Molybdate Dihydrate | 0.04 |
| 6 | Zinc Sulfate | 8.75 |
| 7 | Hemp | 0.02 |
| 8 | Sodium Methyl Cellulose | 0.80 |
| 9 | Ethanol | 0.01 |
| 10 | Non-ionic surfactant | 0.01 |
| 11 | Oil of Sweet Orange | 0.02 |
| 12 | Beta Cyclodextrin | 0.10 |
| 13 | H2O | 40.50 |

Example 5

The following ingredients were combined to prepare a fragrant nutrient solution. However, the desired emulsion did not remain stable, indicating ethanol did not perform well as a primary emulsifying agent.

Example 5 Formulation

| Order | Ingredient | Percentage by mass |
|---|---|---|
| 1 | Sodium Gluconate | 0.536 |
| 2 | Calcium Gluconate | 38.625 |
| 3 | Magnesium Sulfate | 13.942 |
| 4 | Boric Acid | 2.423 |
| 5 | Hemp | 17.143 |
| 6 | IPA | 8.572 |
| 7 | Oleic Acid | 0.010 |
| 8 | Ethanol | 1.071 |
| 9 | Oil of Eucalyptus | 0.429 |
| 10 | Beta Cyclodextrin | 0.107 |
| 11 | H2O | 17.143 |

The following table provides a listing of some of the products and chemicals that were evaluated as potential emulsifiers but were not deemed as effective alone when attempting to prepare stable aqueous fragrant nutrient concentrates. These are contemplated as still suitable ingredients in formulations but did not perform adequately as primary emulsifiers.

TABLE 1

| | Emulsifiers Trialed |
|---|---|
| 1 | Glycerol Monostearate |
| 2 | Stearic Acid |
| 3 | Agar |
| 4 | Methyl Cellulose |
| 5 | Albumen |
| 6 | Lanolin Oil |
| 7 | Beeswax + Borax |
| 8 | Lemon Juice |
| 9 | Yucca Extract |
| 10 | Coconut Milk |
| 11 | Lecithin |
| 12 | Tannin |

TABLE 1-continued

| | Emulsifiers Trialed |
|---|---|
| 13 | Acacia Fiber |
| 14 | Castile Soap |
| 15 | Cetearyl Alcohol |
| 16 | Ethanol |

Example 6

The following ingredients were combined to prepare a fragrant nutrient solution utilizing a blend of two plant extracts as micronutrient sources.

| Example 6 Formulation | | |
|---|---|---|
| Order | Ingredient | Percentage by mass |
| 1 | Boric Acid | 0.39 |
| 2 | Magnesium Sulfate | 4.67 |
| 3 | Iron Sulfate | 8.73 |
| 4 | Manganese Sulfate | 1.06 |
| 5 | Sodium Molybdate Dihydrate | 0.01 |
| 6 | Zinc Sulfate | 2.60 |
| 7 | Buckwheat extract | 3.96 |
| 8 | Hemp | 27.68 |
| 9 | Polysorbate 80 | 15.31 |
| 10 | Oleic Acid | 0.35 |
| 11 | Peppermint Oil | 0.83 |
| 12 | H2O | 34.41 |

In horticulture, one preferred practice to perform a tissue analysis, such as from a crop's leaves, to provide a more detailed understanding of nutritional deficiencies. Such analytical knowledge may accord one the opportunity to apply nutritional supplements or correct any imbalance during a plant's life cycle with the aim of obtaining a better, more healthy harvest. The inventor has extended this practice to the analysis of plant saps and aqueous extracted utilized in the nutrient compositions of the invention. Such informed assay of source fluids can guide sap blending strategy so as to target and deliver the precise formulary recipe for a given horticultural nutritional need utilizing two or more sap or aqueous extract sources. To deliver ever better and more precise compositions, the inventor contemplates the controlled feeding of nutrients to a plant raw material, so as to enrich the nutrient profile of source materials, such as for example, hemp, sorghum, bamboo, or buckwheat feedstocks, in order to optimize subsequent nutritional sap profiles. This manner of tailoring raw material feedstock, as regards nutrient profiles, is believed to deliver optimized nutritional feed stock profiles and subsequent prescriptive crop formulations, using blend compositions of the invention.

Thus, sap or aqueous reconstituted extract analysis enables one to tailor the blend composition to deliver the most effective and most precise nutritional prescription to the grower. Early tissue analysis of preharvest feed stock may permit one carrying out the instant invention to understand plant feedstock to be harvested and used to supply inventive compositions with improved micronutrient profiles.

A general process for more informed blending of plant saps and aqueous extracts utilized in a composition of the invention includes the steps of:

(a) collecting plant sap of reconstituted aqueous extract from desired crop feedstock;

(b) separating the sap or extract form the pulp using juicing equipment to provide a pressed sap or extract;

(c) filtering the pressed sap or aqueous extract;

(d) performing elemental analytical analysis on filtered sap or aqueous extract;

(e) utilizing laboratory data to access the nutrient profiles of each plant sap or extract;

(f) blending saps and extracts according to elemental assay to formulate a composition having the desired balance of micronutrients;

(f) adding one or more emulsifiers, gluconic acid derivatives, salts of sulfuric acid, surfactants, fragrance, and deionized water, to provide plant-sourced nutritional fragrant composition.

Example 7

Freshly harvested industrial hemp plant, including stalks and leaves were fed into a commercial juicer equipped with masticating blade and Archimedes screw feed to separate the fibrous pulp from the sap. The resulting hemp sap was filtered to further remove fibrous solids and thereafter collected as nutritional sap stock. Samples of the hemp sap were sent to a laboratory for elemental analysis. The results of the analysis are reported in Table 2.

TABLE 2

| Raw Hemp Sap Elemental Analysis | | |
|---|---|---|
| | Ingredient | Percentage by mass |
| 1 | Phosphorus | 0.06630 |
| 2 | Potassium | 0.68700 |
| 3 | Magnesium | 0.02930 |
| 4 | Sulfur | 0.04900 |
| 5 | Calcium | 0.05060 |
| 6 | Silica | 0.01130 |
| 7 | Boron | 0.00057 |
| 8 | Iron | 0.00230 |
| 9 | Copper | 0.00012 |
| 10 | Zinc | 0.00170 |
| 11 | Manganese | 0.00065 |
| 12 | Molybdenum | 0.00003 |
| 13 | Cobalt | 0.00001 |
| 14 | Nitrate Nitrogen | 0.03490 |
| 15 | Ammonia Nitrogen | 0.00036 |

Example 8

A portion of the analyzed hemp sap was incorporated into a nutritional composition according to the composition detailed in the following formulation table.

| Example 8 - Analyzed Hemp Formulation | | |
|---|---|---|
| | Ingredient | Percentage by mass |
| 1 | Sodium Gluconate | 0.21 |
| 2 | Calcium Gluconate | 37.00 |
| 3 | Magnesium Sulfate | 10.571 |
| 4 | Boric Acid | 2.114 |
| 5 | Hemp | 15.856 |
| 6 | IPA | 10.571 |
| 7 | Pectin | 0.634 |
| 8 | Ethanol | 1.057 |
| 9 | Lavender Oil | 0.634 |
| 10 | Beta Cyclodextrin | 0.211 |
| 11 | H2O | 21.142 |

Example 9

A sample of dried buckwheat was chopped to a uniform particle size using a coffee mill and transferred to a 2-liter beaker. The milled material was covered with deionized water and heated to a boil. The mixture of water and milled buckwheat was removed from heat and allowed to sit overnight to absorb the water. The following day the reconstituted buckwheat material was fed into the same masticating juicer as with the freshly harvested hemp, and an aqueous extract was collected and filtered. The filtered aqueous buckwheat extract was sent for elemental analysis. The results are reported in Table 3.

TABLE 3

Buckwheat Extract Analysis

|  | Ingredient | Percentage by mass |
|---|---|---|
| 1 | Phosphorus | 0.00490 |
| 2 | Potassium | 0.01150 |
| 3 | Magnesium | 0.00160 |
| 4 | Sulfur | 0.00058 |
| 5 | Calcium | 0.00200 |
| 6 | Silica | 0.00104 |
| 7 | Boron | 0.00003 |
| 8 | Iron | 0.00002 |
| 9 | Copper | 0.00001 |
| 10 | Zinc | 0.00013 |
| 11 | Manganese | 0.00001 |
| 12 | Molybdenum | 0.00003 |
| 13 | Cobalt | 0.00001 |
| 14 | Nitrate Nitrogen | 0.00240 |
| 15 | Ammonia Nitrogen | 0.000001 |

Example 10

In the same manner as used in Example 9, Moringa was reconstituted, and its aqueous juice was extracted and filtered. The elemental analysis is reported in Table 4.

TABLE 4

Moringa Extract Analysis

|  | Ingredient | Percentage by mass |
|---|---|---|
| 1 | Phosphorus | 0.02210 |
| 2 | Potassium | 0.14700 |
| 3 | Magnesium | 0.04460 |
| 4 | Sulfur | 0.06200 |
| 5 | Calcium | 0.08540 |
| 6 | Silica | 0.00720 |
| 7 | Boron | 0.00065 |
| 8 | Iron | 0.00024 |
| 9 | Copper | 0.00001 |
| 10 | Zinc | 0.00025 |
| 11 | Manganese | 0.00029 |
| 12 | Molybdenum | 0.00001 |
| 13 | Cobalt | 0.00001 |
| 14 | Nitrate Nitrogen | 0.00320 |
| 15 | Ammonia Nitrogen | 0.00003 |

Example 11

In the same manner as used in Example 8, dried barley was reconstituted, and its aqueous extract was juiced and filtered. The elemental analysis is reported in Table 5.

TABLE 5

Barley Extract Analysis

|  | Ingredient | Percentage by mass |
|---|---|---|
| 1 | Phosphorus | 0.00990 |
| 2 | Potassium | 0.04230 |
| 3 | Magnesium | 0.00730 |
| 4 | Sulfur | 0.00490 |
| 5 | Calcium | 0.00460 |
| 6 | Silica | 0.00160 |
| 7 | Boron | 0.00003 |
| 8 | Iron | 0.00019 |
| 9 | Copper | 0.00001 |
| 10 | Zinc | 0.00037 |
| 11 | Manganese | 0.00010 |
| 12 | Molybdenum | 0.00007 |
| 13 | Cobalt | 0.00001 |
| 14 | Nitrate Nitrogen | 0.0223 |
| 15 | Ammonia Nitrogen | 0.000016 |

Example 12

Utilizing the analytical information obtained from Hemp sap and Buckwheat aqueous extract, a blend of about 75% hemp sap and 25% buckwheat extract was combined. The blend was utilized to formulate a composition of the invention.

Example12 - Hemp + Buckwheat Formulation

|  | Ingredient | Percentage by mass |
|---|---|---|
| 1 | Buckwheat | 23.966 |
| 2 | Hemp | 59.916 |
| 3 | IPA | 5.992 |
| 4 | Pectin | 0.539 |
| 5 | Lavender Oil | 0.539 |
| 6 | H2O | 9.048 |

Example 13

In a similar process to Example 9, dried hemp is reconstituted, and its aqueous extract is blended with Moringa aqueous extract. Elemental analysis of plant feedstock extracts can guide one to adjust or tailor the levels of elements within certain crop feedstock to provide extract and sap blends that offset elements, low in one crop feedstock, with those elements that are richer in another. The composition of Example 13 demonstrates an improved nutritional balance resulting from blending analyzed extract and sap feedstock.

Example 13 - Hemp + Moringa Formulation

|  | Ingredient | Percentage by mass |
|---|---|---|
| 1 | Moringa | 20.371 |
| 2 | Hemp | 61.114 |
| 3 | IPA | 5.993 |
| 4 | Pectin | 0.563 |
| 5 | Eucalyptus Oil | 0.563 |
| 6 | H2O | 11.396 |

Example 14

In a similar process to Example 12, Hemp sap is blended with Barley aqueous extract to provide a nutritional mixture that incorporates the micronutrients of two plant sources. Example 14 composition is tabled below.

Example 14 - Hemp + Barley Formulation

| | Ingredient | Percentage by mass |
|---|---|---|
| 1 | Barley | 23.966 |
| 2 | Hemp | 59.916 |
| 6 | IPA | 6.112 |
| 4 | Pectin | 0.558 |
| 5 | Oil of Pine Needle | 0.558 |
| 6 | H2O | 8.890 |

Scores of formulations were produced as the inventor diligently sought to discover combinations of aqueous plant saps, plant fragrances, and emulsifying additives that would provide stable, single phase aqueous stable concentrates. The inventor has discovered that higher levels of hemp sap were surprisingly effective in forming stable emulsions as well as supplying the requisite sources of micronutrients and trace elements. Such compositions could thereafter be diluted with no additional emulsifier with no phase separation. Some compositions, however, may benefit from the addition of additional surfactant or emulsifier than provided by solely by hemp sap.

What is claimed:

1. A plant-sourced aqueous composition, suitable for a horticultural use, comprising:
    about 45 percent by weight to about 95 percent by weight of the sap or aqueous extract of hemp;
    about 0.05 percent by volume to about 25 percent by volume of the sap or aqueous extract of buckwheat or moringa;
    about 0.2 percent by weight to about 3 percent by weight of pectin;
    an effective amount of a plant-sourced pesticide selected from the group consisting of the juice, sap, or aqueous extract of tansy, spearmint, mustard, lemongrass, peppermint, geranium, basil, clove, lemon, tea tree, cedarwood, rosemary, eucalyptus, castor, marigold, tobacco, chrysanthemum, and walnut; and
    deionized water;
    wherein the percent by weight is based on the total weight of the composition and the percent by volume is based on the total volume of the composition.

2. A ready to use pesticide composition, suitable for a horticultural plant, comprising the plant-sourced aqueous composition according to claim 1, diluted with deionized water,
    wherein the content of the sap or aqueous extract of hemp is about 0.5 percent by weight to about 30 percent by weight of the ready to use pesticide composition, and the content of the sap or aqueous extract of buckwheat is about 0.05 percent by volume to about 15 percent by volume of the ready to use pesticide composition.

3. A method of providing nutrients and pesticides to a horticultural plant, comprising dispensing the composition set forth in claim 2 in the form of a foliar spray.

4. A fragrant plant-sourced nutritional pesticide composition, comprising the composition set forth in claim 1 and an effective amount of a plant-sourced fragrance selected from the group consisting of the juice, sap, oil, or aqueous extract of apple, cherry, sage, mango, bergamot, copaiba, lavender, eucalyptus, almond, lemon, rose, pine, orange, tangerine, jasmine, and sandalwood.

5. A ready to use fragrant plant-sourced nutritional pesticide composition, suitable for a horticultural plant, comprising the composition according to claim 4, diluted with deionized water,
    wherein the content of the sap or aqueous extract of hemp is about 0.5 percent by weight to about 30 percent by weight of the ready to use fragrant plant-sourced nutritional pesticide composition, and the content of the sap or aqueous extract of buckwheat is about 0.05 percent by volume to about 15 percent by volume of the ready to use fragrant plant-sourced nutritional pesticide composition.

6. A method of enhancing a cellulosic substrate with pesticides and nutrients comprising the steps of:
    applying the composition set forth in claim 4 onto cellulosic waste substrates; and
    drying said cellulosic waste substrate;
    to provide a dried fragrant cellulosic substrate with pesticides and nutrients useful as mulch or top dressing.

7. The method according to claim 6 wherein said cellulosic waste substrate comprises hemp.

* * * * *